June 25, 1963 F. W. KULICKE, JR 3,094,785

AUTOMATIC SEMI-CONDUCTOR WAFER SCRIBER

Filed Dec. 20, 1960 9 Sheets-Sheet 1

INVENTOR.
FREDERICK W. KULICKE, JR.
BY
Belker & Moyerman
ATTORNEYS

INVENTOR.
FREDERICK W. KULICKE, JR.
BY
Bilher & Moyerman
ATTORNEYS

INVENTOR.
FREDERICK W. KULICKE, JR.
BY
Belker & Moyerman
ATTORNEYS

INVENTOR.
FREDERICK W. KULICKE, JR.
BY
Belker & Mayerman
ATTORNEYS

INVENTOR.
FREDERICK W. KULICKE, JR.
BY
Belher & Mongleman
ATTORNEYS

INVENTOR.
FREDERICK W. KULICKE, JR.
BY
Zelher & Morgeman
ATTORNEYS

AUTOMATIC SEMI-CONDUCTOR WAFER SCRIBER

Filed Dec. 20, 1960 9 Sheets-Sheet 7

INVENTOR.
FREDERICK W. KULICKE, JR.
BY
Belker & Moyerman
ATTORNEYS

June 25, 1963 F. W. KULICKE, JR 3,094,785

AUTOMATIC SEMI-CONDUCTOR WAFER SCRIBER

Filed Dec. 20, 1960 9 Sheets-Sheet 8

INVENTOR
FREDERICK W. KULICKE, JR.
BY Belber & Mozuman
ATTORNEYS

INVENTOR
FREDERICK W. KULICKE, JR.

BY *Belker & Mayerman*

ATTORNEYS

United States Patent Office 3,094,785

Patented June 25, 1963

3,094,785

AUTOMATIC SEMI-CONDUCTOR WAFER SCRIBER

Frederick W. Kulicke, Jr., Philadelphia, Pa., assignor to Kulicke & Soffa Mfg. Co., Philadelphia, Pa., a corporation of Pennsylvania Filed Dec. 20, 1960, Ser. No. 77,770
22 Claims. (Cl. 33—32)

This invention relates to a scribing instrument, and, more particularly, relates to a device for automatically scribing or scoring with great precision a rectangular grid of finely spaced lines on a thin wafer of semi-conductor material, for example, germanium, silicon and the like.

In the manufacture of semi-conductor assemblies such as transistors or micro-modules, a thin crystal or wafer of semi-conductive material such as germanium or silicon is first bonded to a conductive header or "substrate" plate, and thereafter fine wire whiskers are secured between particular points or electrodes alloyed to the surface of the wafer and terminal posts on the header or plate. These surface electrodes may be for example compositions of gold, silver, antimony, titanium and/or other elements or alloys which form layers of opposite conductivity on the crystal depending upon the desired characteristics of the finished semi-conductor device. In addition, these surface electrodes may be formed in a variety of designs and configurations on one or both surfaces of the crystal wafer, i.e., a plurality of dots each separated a predetermined spacing, pairs of minutely spaced fine lines or stripes, and/or tiny concentric circles. The individual crystal wafers themselves are quite small and may represent an area ranging from 1/32" to 1/8" on a side so that it is easily seen that the electrode patterns deposited or printed on the surfaces would be microscopic.

As is readily apparent, it would be extremely uneconomical to superimpose the microscopic electrodes upon the crystal wafers individually. Today, the art has developed to the extent that the semi-conductor devices are mass-produced by etching a relatively large slab, i.e. 2" x 2" of the semi-conductor material of a first conductivity type. A composition is then printed upon the surface of the wafer slab as a plurality of dots, stripe pairs, etc., each separated by a predetermined spacing, thereby to form a plurality of P-N junctions within the slab. Finally, the surface of the semi-conductor slab is re-etched and the slab is cut into dice each of which contains a P-N junction.

It is the apparatus and manner of accurately scoring the individual dice with which this invention is concerned, or with the scribing of a wax coating that is placed over the wafer preparatory to chemical etching for dicing purposes.

It is, therefore, an object of this invention to provide an instrument for automatically scribing or scoring with great precision a rectangular grid of finely spaced lines on a thin wafer of semi-conductor material such as germanium, silicon or the like.

Another object of this invention is to construct an automatic semi-conductor wafer scribing instrument which will insure relatively frictionless, uniform motion and velocity during scoring.

Another object of this invention is to construct an automatic or semi-automatic semi-conductor wafer scriber which will eliminate wasted time during each reciprocating stroke.

Another object of this invention is to provide an automatic semi-conductor wafer scriber which will be indexed with fine precision after the scoring stroke is once preset.

Another object of this invention is to provide an automatic semi-conductor wafer scriber which will be immediately stopped at the end of its operating cycle.

Other objects of this invention are to provide an improved device of the character described that is easily and economically produced, which is sturdy in construction, and which is highly efficient in operation.

With the above and related objects in view, this invention consists of the details of operation and combination of parts as will be more fully understood from the following detailed description when read in conjunction with the accompanying drawings in which.

Figure 1:
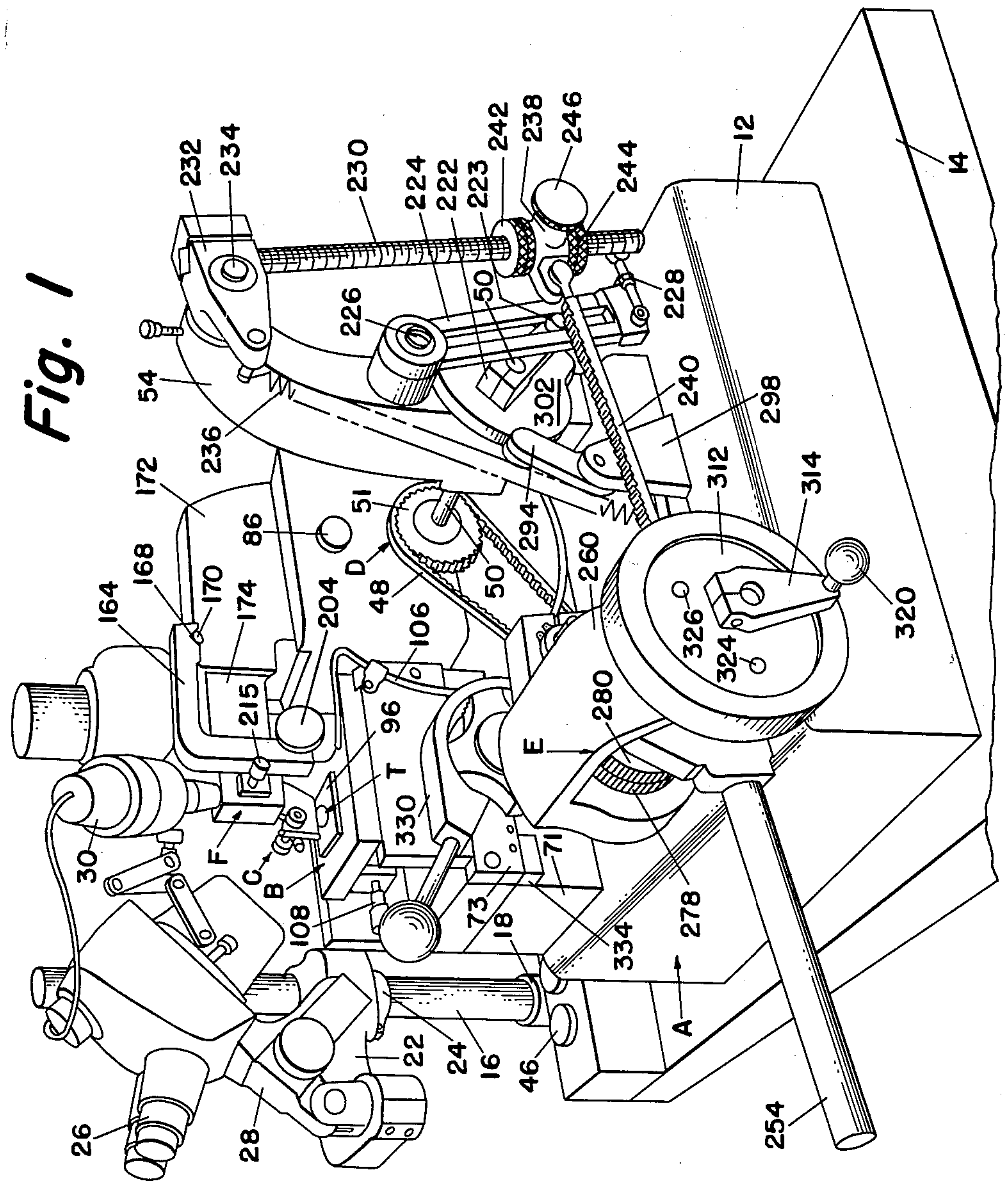
FIG. 1 is a perspective view of an automatic semi-conductor wafer scriber embodying this invention.

Referring now in greater detail to the drawings in which similar reference characters refer to similar parts, there is shown an automatic semi-conductor wafer scriber comprising a frame, generally designated as A, a work table B, longitudinally reciprocable along one horizontal axis in said frame and laterally movable along a second horizontal axis transverse thereto, a scribing head, generally designated as C, a drive unit D imparting horizontal reciprocating motion to said work table, and an indexing and feeding head, generally designated as E, also coupled with said drive unit and progressively moving said table laterally a precise predetermined dimension with each cycle of reciprocation thereof.

Referring to FIG. 1, the frame A is of steel or cast iron construction and comprises a base 12 which is mounted upon a table 14. A column 16 vertically extends from a support member 18 which is integrally cast as part of the base 12. The upper portion of the column 16 has an arm 22 rotatably supported thereon and held in any desired elevation by a split collar 24. A stereo-microscope 26 is adjustably secured to the support arm 22 by a pod bracket 28. The microscope 26 is preferably oriented so that approximately a 45° angle exists between the axis of the objective lenses and the top of the work table B, the working distance of the microscope being approximately 4 inches thereabove. An illuminator 30 is adjustably coupled to the microscope 26 and swings therewith about the column 16 so that an operator may easily observe the wafer slab T mounted on the table top B and make the necessary indexing adjudgments upon the scriber as will be more fully described hereinafter. The microscope 26 is also free to be pivoted out of the way when mounting the slab T upon the work table A or when the semi-automatic or fully automatic scoring operations are begun.

Figure 2:
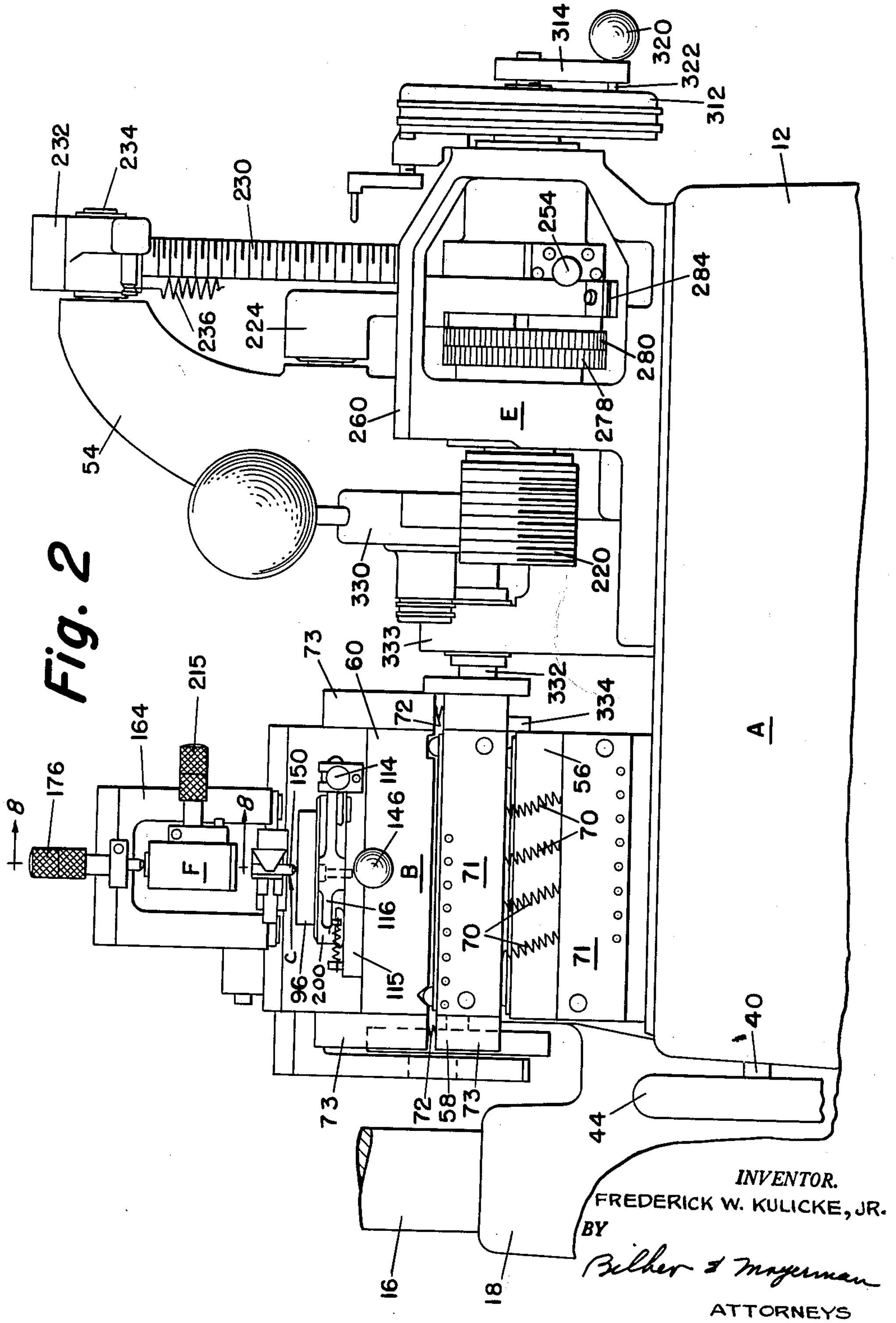
FIG. 2 is a front elevational view thereof.

The drive unit D comprises a motor-reducer 32 which is mounted below the table 14 and is coupled to an electro-magnetic clutch 34 through chain drive 36 and sprockets 37 and 38. See FIG. 3. The opposite end of secondary of the clutch 34 is connected to a main drive drive shaft 40 by belt and pulleys (notched) 42, the main shaft 40 having a hand wheel 44 fixed thereto outside the left hand side of the scriber as shown in FIG. 2. Energizing the motor 32 by depressing the start switch 46 also energizes the magnetic clutch 34 for fully automatic operations. The drive shaft 40 may be driven by hand through the cranking of the hand wheel 44 to perform semi-automatic operations so long as the electro-magnetic clutch 34 and motor 32 remain unenergized. A crank or cam shaft 50 is driven by the main shaft 40 through a notched belt 48 and pulleys 49 and 51.

Figure 10:
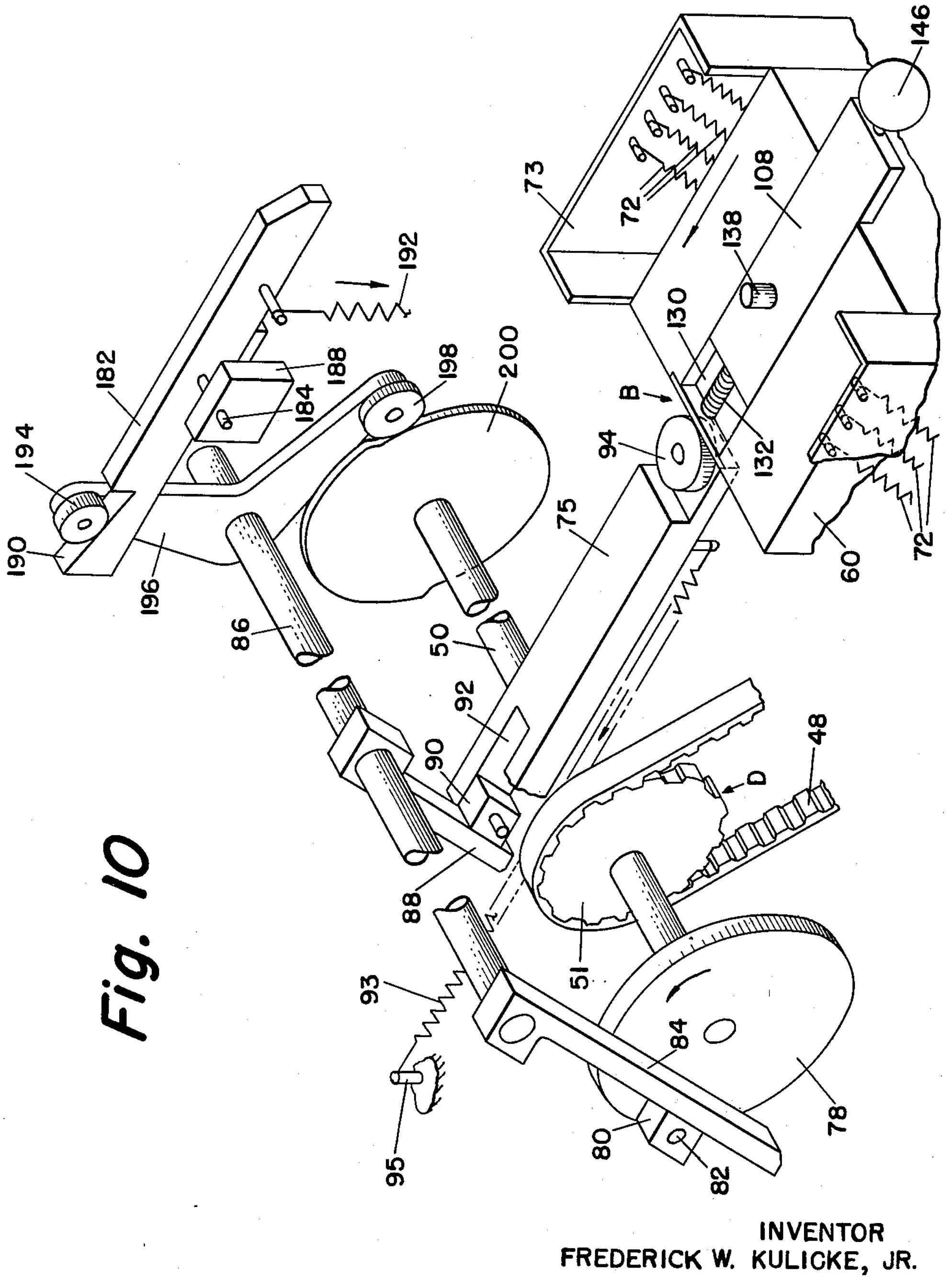
FIG. 10 is a perspective view, and partly exploded, of the table reciprocating means and stylus lifting linkage.

The cam shaft 50 is journaled at one side within a housing 52 at the left hand portion of the machine and within a vertical post 54 extending upwardly from the base 12 at middle right hand portion thereof as shown in FIGS. 1 and 10.

Figure 4:
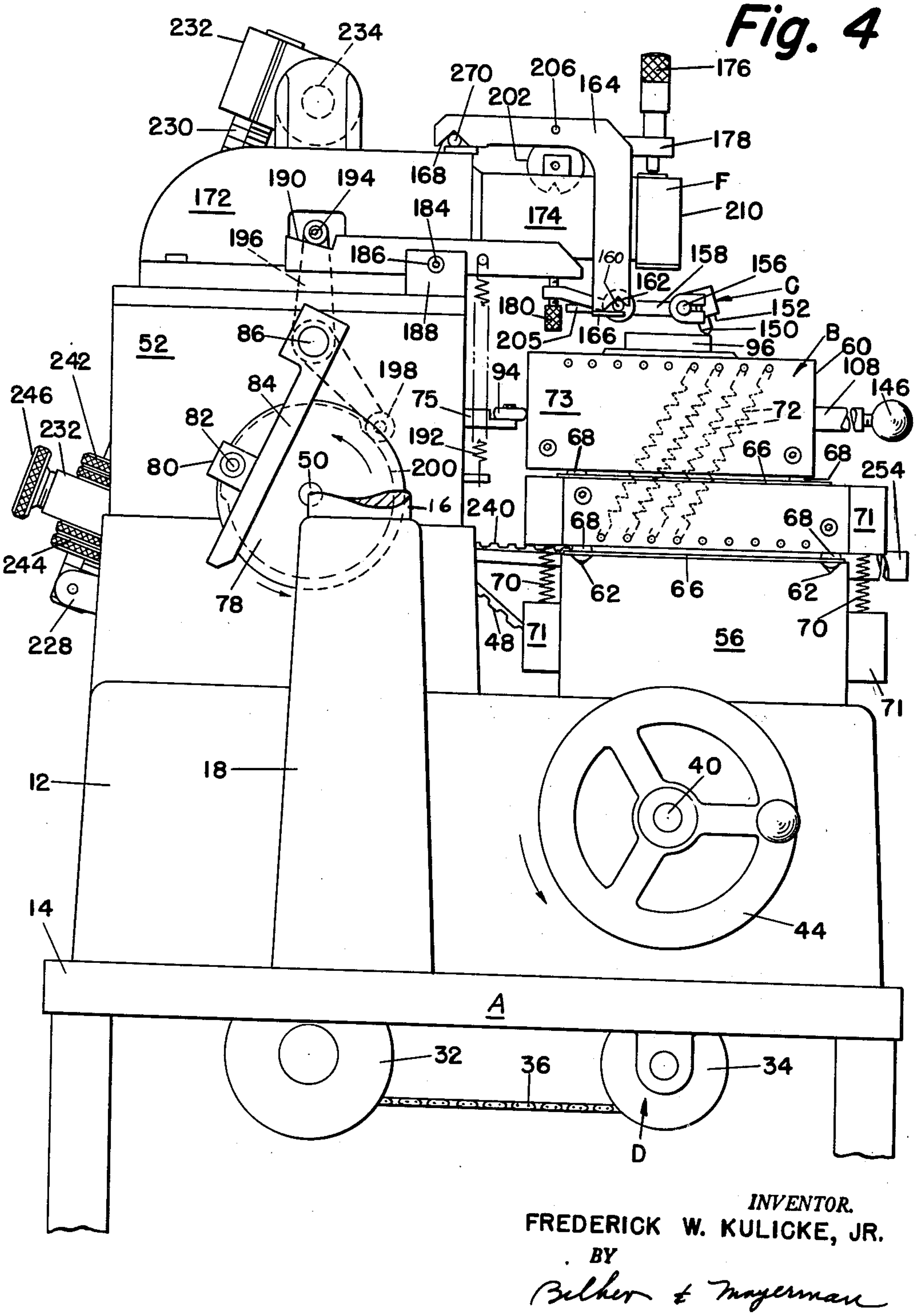
FIG. 4 is a side elevational view thereof from the other side.
Figure 9:
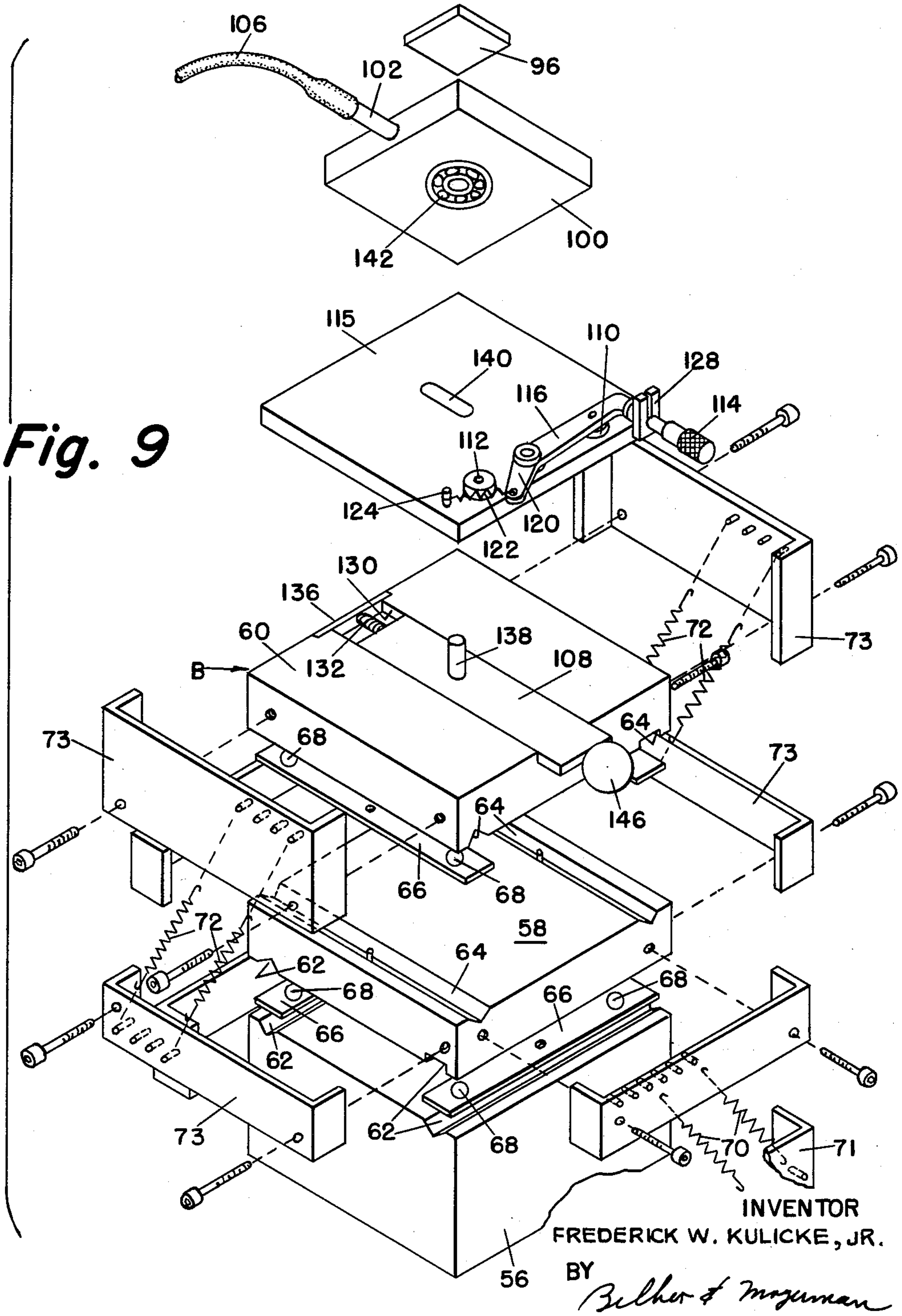
FIG. 9 is a perspective view and partly broken away of the reciprocable table.

Referring to FIGS. 2, 4 and 9, the reciprocable table B comprises a bottom plate 56, a second stage slider 58 laterally glidable thereon along an X-axis, and a first stage glider 60 longitudinally glidable on the second stage transverse to the latter's motion and along a horizontal Y-axis. Suitable grooves 62 in the upper face at the bottom plate 56 register with complementary spaced parallel grooves in the lower face of the second stage slider 58. Likewise, grooves 64 in the upper face of the second stage slider oriented at right angles to the grooves 62 register with complementary spaced parallel grooves in the lower face of the first stage slider 60. Micarto ball separators 66, each substantially similar to those shown in my prior co-pending patent application Serial No. 21,706, filed April 12, 1960 and having four notches or holes adjacent the lateral edges thereof are inserted intermediate the respective base and sliders so that the notches register with the corresponding groove therein. A steel ball 68 is mounted within each of the four notches or holes in the separators 66 whereby the second stage 58 glidably rolls on the base 56, and the first stage 60 glidably rolls on the second stage at right angles to the line of motion thereof. Extension coil springs 70 are looped about pin hangars secured to brackets 71 mounted on the base 56 and the second stage slider 58 (four on the front and four on the back edges), and resiliently draw these into the surface to surface abutment. Similarly, coil springs 72 mounted on hangar pin sprockets 73 at the lateral edges of the second stage slider 58 and the first stage slider 60 resiliently urge these into face to face engagement over the ball bearings 68. Both the coil springs 70 and 72 resiliently extend as the fore and aft reciprocable motion and the lateral indexing positioning of the table occurs. The springs 72 also serve to constantly draw and maintain the first stage 60 or Y-axis slider into abutment with a horizontally oscillating ram 75 which is driven through a linkage by the cam 50 as will now be described.

Referring particularly to FIGS. 4 and 10, a cam wheel 78 is affixed to the left outboard end of the cam shaft 50 and is rotatable therewith. The drive linkage between the rotary elements and the slidable ram 75 is to provide substantially uniform velocity during the cutting stroke (when the table B is moving toward the reader) and a return stroke providing minimum lost time. During the return stroke, the rotary elements operate a cam linkage to lift the scribing stylus head C so that likelihood of damage to the crystal wafer will be minimized. A camming block 80 is eccentrically positioned on the cam wheel 78 and is rotatable on a stud 82 affixed to the outboard face of the cam wheel adjacent the outer periphery thereof. See FIG. 4. A cam block follower arm 84 is affixed at one end to a shaft 86 pivoted along a horizontal axis within the housing 52. As the cam wheel 78 rotates in a counterclockwise direction as shown in FIG. 4, the block 80 which is retained in slidable engagement with the follower arm 84 causes the said arm to pivot through an angle of approximately 30°. Oscillation of the follower arm 84 effects similar pivotal motion of crank arm 88 which is also fixedly secured to the pivot shaft 86. The lower end of the crank arm 88 has a rotatable block 90 which engages against a blind wall 92 within the ram 75, the latter being slotted to receive the crank arm. As is apparent, the first stage slider 60 is resiliently loaded against a roller 94 at the nose of the ram 75 by the coil springs 72 which urge the slider to follow the ram. In addition, auxiliary extension spring 93 couples the ram 75 with a pin hangar 95 extending from the rear interior of the housing 52. As a consequence, the blind wall 92 is urged against the block roller 90 causing clockwise pivotal proclivity of crank arms 88. Thus, the follower arm 84 is maintained in slidable abutment with the camming block 80. The lower 180° peripheral arc of the block 80 is therefore, converted into a substantially linear velocity of the ram 78 during the cutting stroke of the stylus. The normal stroke of the Y-slider 60 is 1½" which is adjustable by positioning the cam block 80 radially closer to the center of the cam wheel 78. It is also possible to adjsut the initial position of the wafer T with respect to the scribing head C by turning a "zero" adjustment positioner (not shown) on the roller 94 at the forward end of the ram 75. For example, the roller 94 may be threaded into the ram nose with a knurled lock nut.

Figures 7, 8:
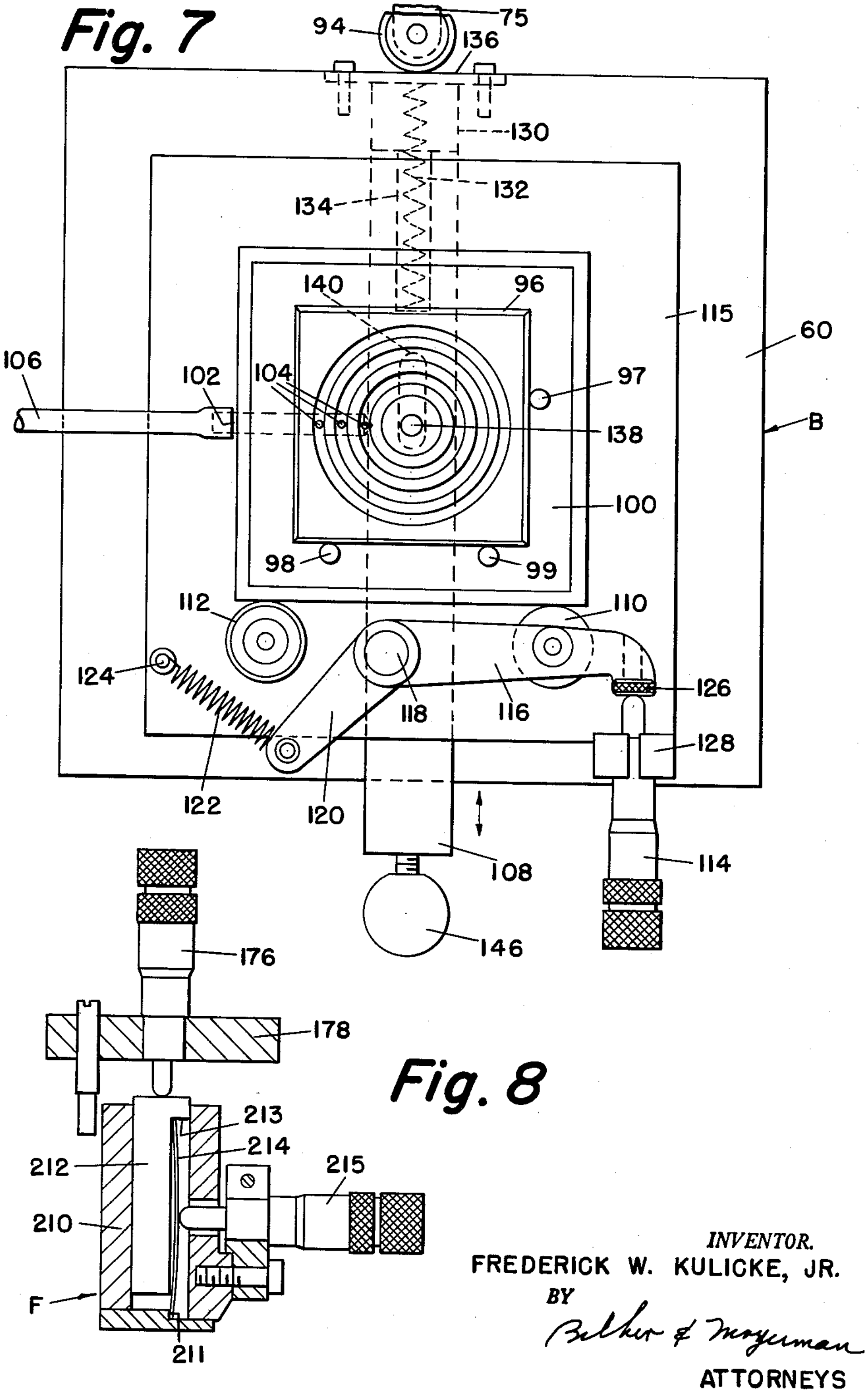
FIG. 7 is a top plan view of a reciprocable table embodied in this invention.
FIG. 8 is a sectional view taken along lines 8—8 of FIG. 2.

Referring to FIG. 7, the wafer slab T is mounted upon a precision square glass plate 96 approximately 2" x 2" x ½" and which has the two faces ground flat and parallel. With the wafer slab approximately centered on the plate 96 and with the rectangularly printed design on the slab oriented substantially parallel to one edge of the plate, a small amount of wax is placed on the plate around the periphery of the slab. By gently applying heat from an infrared lamp on the slab T, the wax will run by capillary action under the wafer slab and build up a slight dam or fillet about the periphery thereof.

The glass plate 96 is then placed, wafer slab up, on a mounting plate support 100 against three pins 97, 98 and 99 which define a register surface. The mounting plate support 100 is of tool steel lapped flat and parallel so that the square configuration thereof defines four precison right angles enabling rotation of the support through 90° without requiring any adjustment of angular position. Thus, after a series of lines have been scribed parallel to and intermediate one row of printed marks or indicia on the slab T, the support 100 may be indexed, and any lines scribed at right angles to the original scribed lines can be held at exactly 90° without the necessity of readjustment. The plate support 100 is provided with a tube 102 which extends through one side thereof and communicates with the upper support surface by way of several openings 104. A tygon hose 106 couples the tube 102 with a small vacuum pump whereby the suction created at the upper support surface acts to hold down the glass plate 96 throughout the entire scribing operation.

Referring to FIGS. 7 and 9, the mounting plate support 100 is held in position by a spring-loaded plunger 108 against two locating rollers 110 and 112. Roller 112 has a stationary axis which extends vertically from the upper face of a first stage cover plate 115 while roller 110 has a manipulatable horizontal position and can be moved back and forth through micrometer adjustment 114. The roller 110 is rotatably supported on a lever arm 116 pivotally mounted on bearing stud 118. Angularly affixed to the lever arm 116 and rotatable therewith on stud 118 is an arm 120 having the free end thereof resiliently urged clockwise by the tension of coil spring 122 which couples the end of the arm 120 with hanger pin 124. Thus, anvil 126 at the end of lever arm 116 is urged into abutment with the spindle of micrometer 114, the barrel thereof being mounted within split clamp bracket 128 which is secured to the first stage slider 60. Adjustment of the micrometer 114 thereby oscillates the plate support 100 so that the wafer slab T mounted on the glass plate 96 may angularly reorient and enable the marked indicia on the slab to be disposed precisely parallel to the table B reciprocable movement. Such adjustment is, of course, accomplished under microscope observation.

The plunger 108 is of generally rectangular cross-section and is slidably contained within a complementary slot 130 longitudinally extending within the upper surface of the first stage slider 60. A coil spring 132 is compressed within a longitudinal blind bore 134 by a hardened steel wear or back-up plate 136 mounted at the rear wall of slider 60, the plate 136 also serving as a wear plate against which the ram roller 94 abuts. The plunger 108 has a hardened steel pin 138 which vertically extends upwardly through a slot 140 in the cover plate 115. The cover plate 115 retains the plunger 108 within slot 130, and the forward edge of the slot 140 in the cover plate engages the pin 138 to arrest the extension of the plunger resulting from the compression of spring 132. The pin 138 extends above the upper surface of the cover plate and detachably interfits within a precision ball bearing 142 centrally disposed, within the bottom of the mounting plate support 100. A plug 144 is recessed below the upper surface of the support 100.

When wafer slab T has been scribed completely in one direction, the operator, with one hand holding knob 146, depresses the plunger 108 toward the rear of the machine against the bias of spring 132. This releases the support 100 from abutment against rollers 110 and 112. Now, the operator, with his other hand, can rotate the mounting plate support 100 through 90°. On slow release of the plunger 108, the wafer slab T is brought back into an accurately indexed position exactly 90° from its former alignment.

Figure 3:
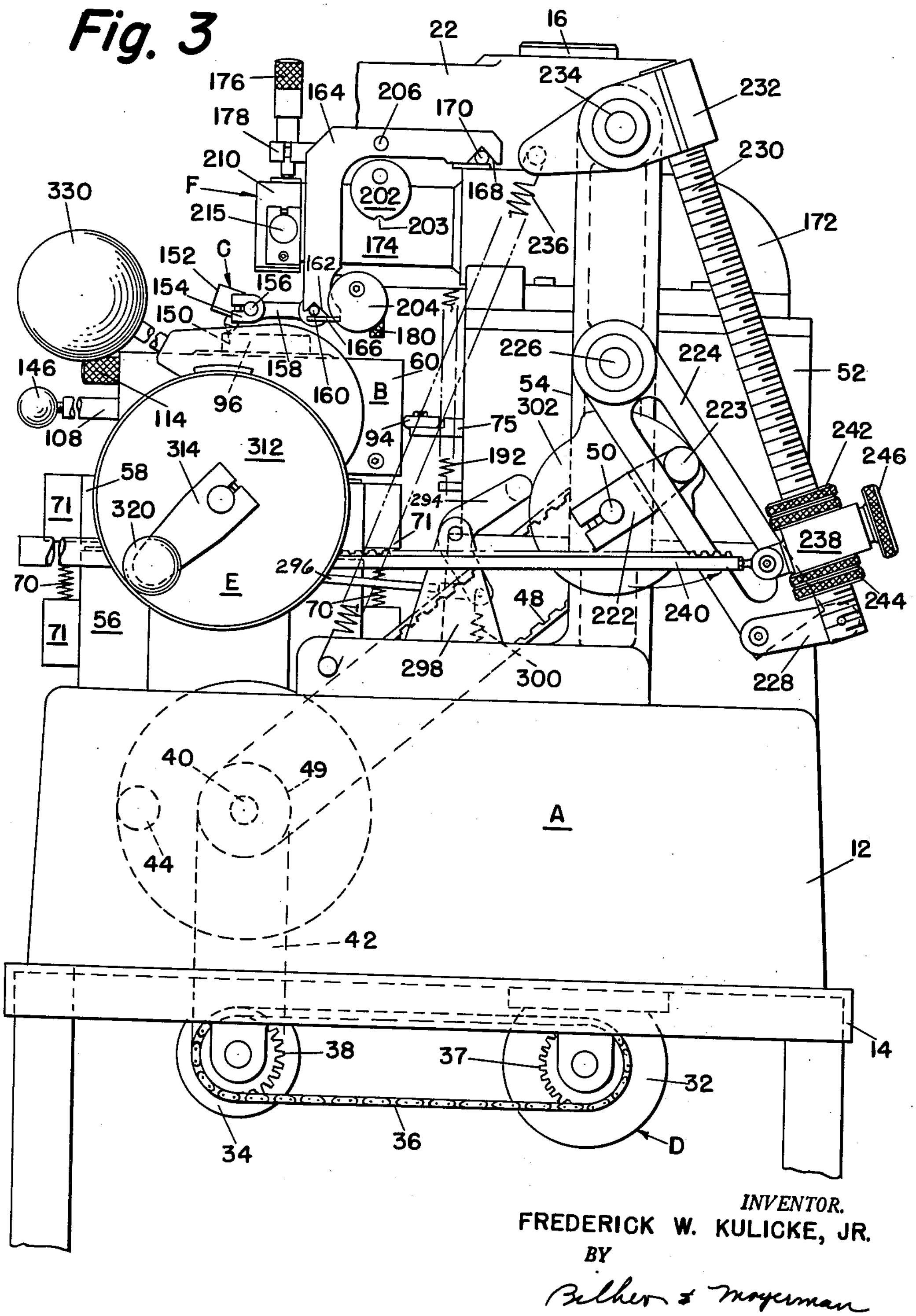
FIG. 3 is a side elevational view thereof from one side.

Referring now to FIGS. 3, 4 and 10, the scribing head C comprises a diamond pointed stylus or scriber tool 150 which is mounted within a tool holder 152 pivotally secured within a split clamp 154 by dowel 156. The holder 152 is pivotally adjusted within the clamp 154 to provide appropriate rake angle to the stylus 150. Suitable weights may be hung on the dowel 156 to provide the desired scribing pressure on the slab to be scored. The clamp 154 is mounted adjacent one end of a lever 158 having a medial trunnion 160.

The trunnion 160 is supported at each side within a pair of inverted V notches 162 at the bottom of a suspension yoke 164. Flat springs 166 retain the trunnion 160 in pivotal engagement with the notches which act as a fulcrum. The yoke 164 is itself pivotally supported at its rearward portion by inverted V notches 168 which freely engage fulcrum rod 170 extending from a support member 172 mounted upon the top of the housing 52. A cantilever beam 174 extends forwardly from the support member 172 and has scriber tool suspension F mounted on the front end thereof. A micrometer 176 has its fixed barrel mounted within bracket 178 secured to the forward portion of the yoke 164 whereby the micrometer spindle bears upon the top of the suspension F to define a forward support for the scriber head C and coarse vertical adjustment therefor. Thus, the vertically mounted micrometer 176 is utilized to set the gross positioning of the point of the stylus 150 to about .005 to .010″ above the wafer, clockwise rotation of the micrometer raising the tool.

It is also readily apparent that a jeweled pivot type mounting may be employed for the tool and yoke suspensions by substituting for the inverted V grooves 162 and 168 opposed conical jeweled bearings aligned along respective horizontal axes and conically pointing the ends of the trunnion 160 and the fulcrum rod 170 to interfit within the respective bearings.

The rearwardly disposed portion of the tool lever 158 has a knurled thumb screw 180 therein, the upper portion of which abuts against the lower portion of an automatic lifting lever 182. See FIG. 4. This thumb screw 180 adjusts the distance the stylus 150 elevates above the wafer slab T during the return stroke, i.e., when the table B moves rearwardly during the front to back portion of the reciprocating cycle. To minimize the effects of shock and vibration on the tool 150, this elevational distance should be adjusted between .015″ and .020″. The lifting lever 182 has a medial fulcrum shaft 184 which is pivotally supported within bearings 186 in pillow blocks 188. At the rearward end of the lifting lever is a camming detent 190, and a coil spring 192 at the front of the lever resiliently urges the detent 190 into engagement with roller 194 on an angular actuating link 196. The link 196 is freely rotatable on the table crank shaft 86, but is not keyed to rotate therewith as are the slide follower 84 and the crank arm 88. Cam follower 198 on the link 196 conforms to the periphery of lifter cam 200 which is keyed to rotate with shaft 50. It is easily seen that when the follower 198 rides up on the protuberance on the cam 200 (approximately 50 percent of the peripheral surface), the forward portion of the lifting lever 182 is elevated against the bias of spring 192. Correspondingly, the tool lever arm adjusting screw 180 will follow the lifting lever as a result of the weight at the forward end of the tool holder 158. The stylus 150 will accordingly abut against the surface of the slab T during the cutting stroke of the table B as the table moves forwardly. During the return stroke of the table B, the follower 198 drops into the valley of cam 200 whereby the lifting lever 182 abuts against the screw 180 so that the stylus 150 is automatically lifted from the work to avoid injury to the crystal. Manual lifting latches 202 and 204 are each eccentrics which permit raising of the stylus 150 as for example when it is desired to mount the glass work plate 96 on the table B or to rotate the support plate 100 through 90°. Latch 202, when manually rotated through 180° as shown in FIG. 3, has a detent 203 which engages on pin 206, to elevate the entire yoke suspension 164. Latch 204 performs a similar function by rotating it counterclockwise as shown in FIG. 3 by engaging a tongue 205 transversely extending from the rear end of tool lever 158.

As has been described previously, the coarse vertical positioning of the scribing stylus 150 is accomplished by adjustment of micrometer 176. The fine vertical positioning of the stylus is done through the scriber tool suspension F. The suspension F, as best illustrated in FIG. 8, comprises a casing 210 vertically channeled to receive a slide 212. A flat spring 214 engages a lip 213 at the upper portion of the plunger slide 212 and a recess 211. Micrometer 215 has a spindle which extends through the cover of the casing 210 and bears against the spring 214. The spring 214 is laterally bowed away from the slide 212 and abuts up against the head of the micrometer 215 spindle whereby clockwise rotation of the micrometer 215 will tend to straighten the "bow" to urge the slide upwardly against the spindle of micrometer 176. As is readily apparent, the longitudinal motion of the micrometer 215 spindle is translated into a much smaller vertical movement of the slide, and since the casing 210 is on a fixed beam 182, the entire yoke 164 will elevate. Adjustment of the depth of cut with the mount suspension F can easily be adjusted within a few hundred thousandths.

Referring now to the table indexing and lateral feed E as is best illustrated in FIGS. 2, 3, 5 and 6, the linkage is taken off of the rotary drive shaft 50 which ratchets a micrometer lead screw 220 and the system is set up so that extremely accurate spacings can be held between each scribed line without any accumulation of error. Crank arm 222 is pinned to the right hand end of crank shaft 50 and has a follower pin 223 slidably engaged within slider arm 224 which is rotatably supported above shaft 50 on vertical post 54 at bearing 226. The lower end of the slider arm 224 is coupled to the lower end of a metronome arm 230 by a link 228. The upper end of the metronome arm 230 is mounted within a bracket 232 pivoted to the post 54 at 134. A tension spring 236 biases the front portion of the bracket 232 toward the base 12. A feed rack 240 is pivotally coupled to a collar 238 which is adjustably secured on the metronome arm 230 for varying the stroke of the rack. Moving the collar 238 up on the metronome arm decreases the table B feed, i.e., reduces the spacing between lines scored on the wafer T. Lowering the collar 238 on the metronome 230 correspondingly increases the spacing between scribe lines on the wafer. Knurled nuts 242 and 244 threadedly engage the metronome arm 230 which is a threaded rod having a longitudinally extending flat portion thereon. After the collar 238 is adjusted in position by thumb screw 246 and a preliminary check made on the table feed. The nuts 242 and 244 are tightened down about the collar for full automatic operation. It has been found that the indexing feed E will produce .001" increment of feed at the table for variously pitched lead screws 220 with corresponding displacement of the collar 238 on the metronome arm 230 as follows:

| | | | |
|---|---|---|---|
| Lead screw pitch (threads per inch) | 10 | 20 | 40 |
| Displacement of collar (inches) | 3/32 | 3/16 | 3/8 |

The above table will serve as a guide for indexing of the table feed.

Figure 5:
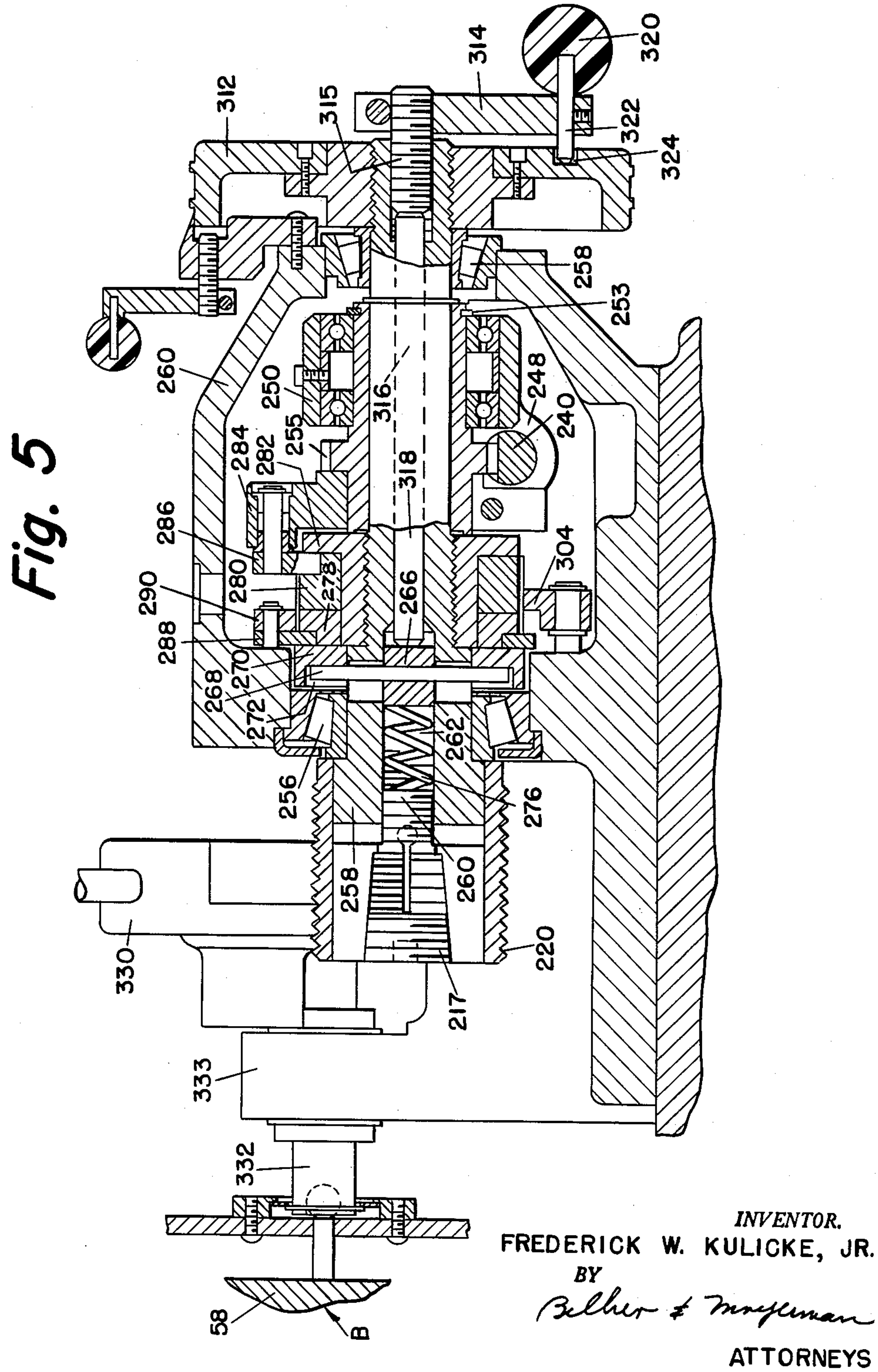
FIG. 5 is a section view taken along lines 5—5 of FIG. 3 showing the details of a scriber indexing mechanism embodied in this invention.
Figure 6:
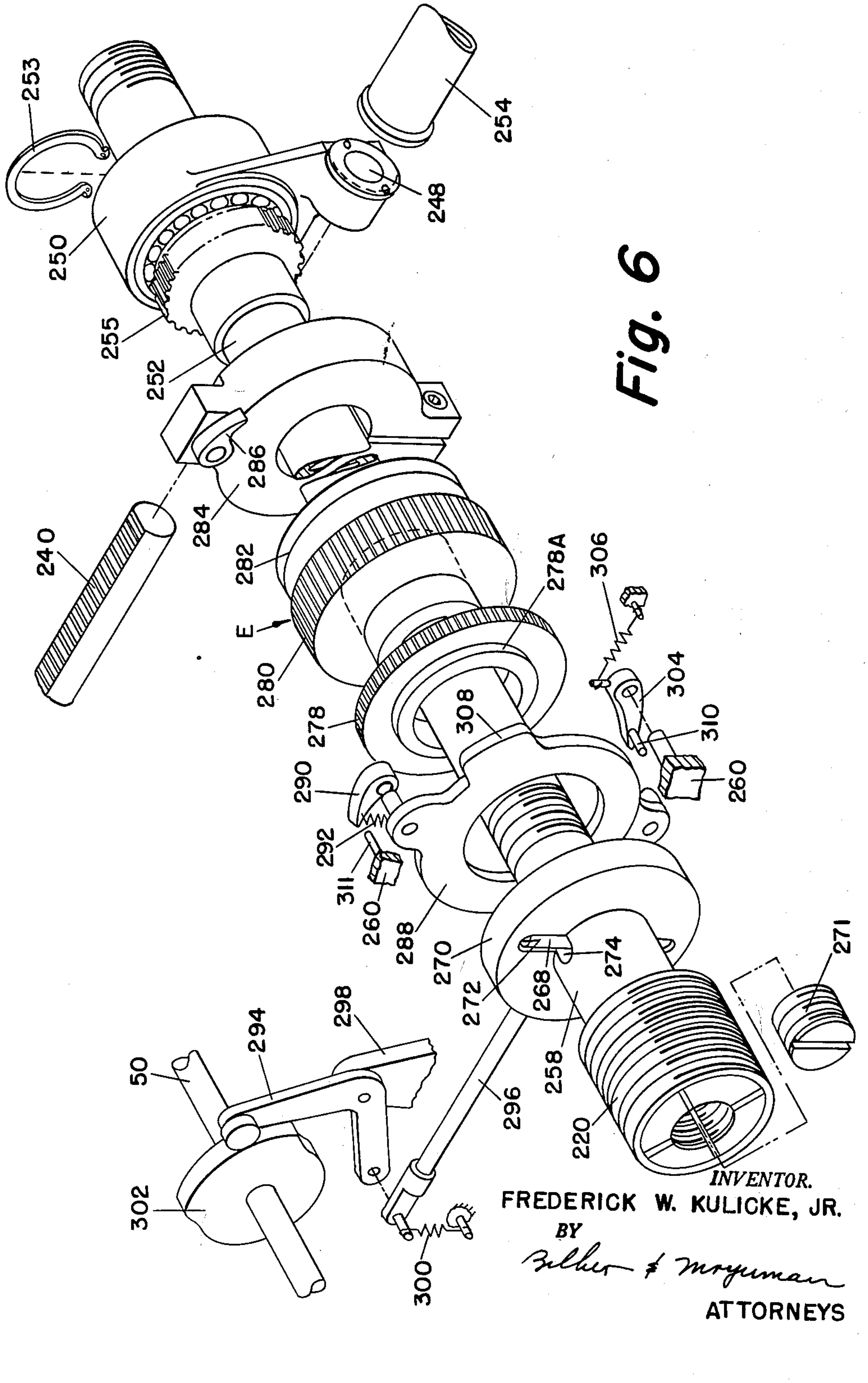
FIG. 6 is a perspective exploded view of the indexing mechanism.

Referring particularly now to FIGS. 5 and 6, the rack 240 is substantially semi-circular in cross-section, and is slidably retained within slide bearing 248 which is integrally cast with rotary support bearing 250. The bearing 250 is rotatably self-adjustable on indexing shaft 252 to accommodate for the positioning of the rack 240 and collar 238 on the metronome. Longitudinal restraint for the support bearing 250 is afforded by snap ring 253 and pinion gear 255. A tubular guard 254 is mounted on the face of slide bearing 248 to encase the rack 240 and protect the operator during the stroke thereof. The shaft 252 is rotatably supported within tubular bearings 256 and 258 mounted within a case housing 260. The pinion gear 255 itself is keyed to the shaft 252 so that the latter rotates with each stroke of the rack 240 and in the same direction therewith.

The feed screw 220 is supported about the periphery of a sleeve 259 and affixed to the sleeve by stud 260 threadedly engaging an internally threaded bore 262 therein. Slidably supported within a counterbore 264 at the end of shaft 252 is a plug 266 which has a pin 268 diametrically extending therefrom. The outer portion of the shaft 252 has a collar 270 which is rotatably slidable thereon. A diametrical slot 272 in the collar 270 is complementary with the pin 268 so that when the pin is engaged within the slot the collar will rotate with the shaft 252. The sleeve 259 has a notch 274 which also engages the pin 268 whereby the lead screw 220 is ordinarily rotatable with the indexing drive shaft 252. A spring 276 compressed within the bore 262 biases the plug 266 to the right, as shown in FIGS. 5 and 6, so that the pin 268 interfits with the slot 272 and locks the lead screw 220 with the collar 270. Cap screw 271 closes the end of the lead screw 220.

Ratchet wheels 278 and 280 are rotatably slidable upon one end of the shaft 252, and the bias of spring 276 urges the pin 268 and the collar 270 to the right so as to sandwich the ratchet wheels 278 and 280 against plate 282 and clamp ring 284. Clamp ring 284 is fixedly secured to the shaft 252 and is rotatable therewith, and the collar 270 and plate 282 act as a clutch frictionally urging the cam wheels into rotatable engagement with the shaft 252.

A drive pawl 286 is pivotally mounted to the clamp ring 284 and is biased by a spring (not shown) into engagement with the ratchet wheel 280. Freely rotatable on a shoulder 278A on the ratchet wheel 278 is a ring 288 to which a positive indexing pawl 290 is pivotally secured. A biasing spring 292 normally urges the indexing pawl 290 into engagement with the ratchet wheel 278. The actuating ring 288 is coupled to a cam follower link 294 by a connecting rod 296, the follower being pivotally supported within ear 298 and urged by spring 300 into camming engagement with the surface of cam 302 also rotatable with the cam shaft 50. As is easily apparent, the positive indexing pawl 290 is cammed into engagement with the ratchet wheel 278 each time the cam follower 294 rides up on the projection of cam 302 with each rotation of the cam shaft 50. A back stop pawl 304 is pivotally secured within the housing 260 and is urged into engagement with the ratchet wheel 278 by spring 306. The directional force of the back stop pawl 304 is counter to that exerted by positive index pawl 290 on the ratchet wheel 278. A camming projection 308 on the actuating ring 288 abuts against pin 310 extending from the back stop pawl to drive the latter out of engagement with the ratchet wheel 278 during a portion of the positive indexing stroke. A pin 311 also extending from the housing 260 cams the positive indexing pawl 290 out of engagement with the cam wheel 278 at the end of the actuating ring stroke so that the pawl will be released without binding from the teeth of the ratchet wheel 278.

Thus, the action of the rack 240 intermeshing with the pinion 255 and the action of the drive pawl 286 intermeshing with the ratchet wheel 280 will rotate the lead screw 220 clockwise as shown in FIG. 6 with each reciprocating stroke of the rack 240. At the end of the stroke of the rack 240, the positive indexing pawl will be cammed into engagement with the ratchet wheel 278 thereby positively indexing the rotation of the lead screw 220. The back stop pawl 304 will be biased into engagement with the ratchet wheel 278 counter to the rotation resulting from the positive indexing pawl 290. Therefore, the pawl linkage arrangement prevents override and backlash inherent in the rack system and insures precise indexing.

A micrometer dial 312 is threaded and affixed to the right hand end of the indexing shaft 252. A brake release crank 314 is clamped to a shank 315 which is in threaded engagement with an interior thread at the right hand end of indexing shaft bore 316. A plunger 318 slidably supported within the bore 316 is urged by the spring 276 and the plug 266 against the shank 315. The pitch of the threaded shank 315 and the complementarily threaded interior of the bore 316 is such that the pin 268 will be longitudinally urged out of engagement with the slot 272 in the collar 270 when the crank 314 is rotated 180° clockwise about the micrometer dial 312. A spring loaded knob 320 on the crank 314 has a pin 322 which engages either detent 324 or 326 in the micrometer dial, detent 324 being the clutch locking detent, and detent 326 being the release.

A lead screw follower engagement arm 330 is pivotally secured to table feed rod 332 and is longitudinally movable therewith. The other end of the table feed rod 332 is coupled directly to the second stage or X-axis slider 58 so that when the follower engagement arm 330 is in intermeshing engagement with the lead screw 220, the table B will be longitudinally moved a predetermined distance to the right with each reciprocating stroke of the table along the Y-axis. A limit switch 334 is actuated at the extreme right hand position of the table B to automatically turn off the motor drive 32 at the end of the lateral stroke of the table.

The automatic indexing drive thereby indexes the wafer T a pre-set distance from right to left. Scribed lines can be spaced from .006" to .100" depending upon which of the lead screws 20 is selected. In order to adjust the automatic indexing feed, lift the lead screw follower engagement arm 330 from the lead screw 220 and rotate i out of the way. Engage the brake on the micrometer dia 312 by rotating the crank 314 clockwise and turn the mi crometer dial clockwise to zero. Re-engage the brak clutch mechanism by rotating the crank 314 counterclockwise to its original position. The motor is turned on by pressing the start button 46, the machine allowed to complete a single cycle and then turned off. The position of the micrometer dial 312 is observed after this first cycle as indicating the setting of the indexing feed E. This setting may be increased or decreased by moving the collar 238 up or down on the metronome slider arm 230 as described hereinbefore.

Although this invention has been described in considerable detail, such description is intended as being illustrative rather than limiting, since the invention may be variously embodied, and the scope of the invention is to be determined as claimed.

What is claimed is as follows:

1. An automatic semi-conductor wafer scriber comprising a frame, a table longitudinally reciprocable along one axis in said frame and laterally movable along a second horizontal axis transverse thereto, a scribing stylus in engagement with the wafer during the stroke of the table in one direction and elevated from the wafer during the stroke in the other, means imparting reciprocating motion to said table, intermittently actuated drive means imparting a uni-directional transverse motion to said table, and indexing means coupled with said first and second-mentioned means progressively moving said table laterally a precise predetermined dimension with each full cycle of reciprocation of said table.

2. The invention of claim 1 wherein said first mentioned means comprises a rotatably driven element, cam means coupled with said rotatably driven element and transmitting a swinging motion in a preferential direction at zero acceleration, and a crank coupled with said cam means translating a 360° rotary motion into a reciprocating motion of substantially uniform velocity during the cutting stroke of said stylus.

3. The invention of claim 2 wherein said cam means comprises a wheel, a block pivotally supported on said wheel and eccentrically positioned thereon, and a follower arm pivoted outside the orbit of rotation of said block and urged into slidable engagement therewith directly coupled with said crank.

4. The invention of claim 1 wherein said indexing means comprises a screw, rotary drive means co-axial with said screw, reciprocating means reversibly changing the direction of rotation of said rotary drive means, ratchet means frictionally coupling said screw with said rotary drive means, first pawl means directly coupled with said rotary drive means rotating said ratchet means in a predetermined direction, and second pawl means associated with said reciprocating means and actuated by each cycle of reciprocation thereof cammed into intermittent engagement with said ratchet means to positively index the rotation of said screw whereby a precise constant increment of arc in rotation of said screw will occur with each full cycle of said reciprocating means.

5. The invention of claim 4 wherein said rotary drive means comprises a pinion.

6. The invention of claim 5 wherein said reciprocating means comprises a rack in intermeshing engagement with said pinion, a metronome arm pivotally mounted within said frame and swinging arcuately with each cycle of reciprocation of said table, and a collar adjustably positioned on said metronome arm and coupling said rack therewith whereby the increment of lateral movement of said table may be varied.

7. The invention of claim 1 wherein said scriber is manually driven.

8. The invention of claim 1 wherein said scriber is motor driven and cuts off after said table has moved laterally a predetermined distance.

9. The invention of claim 1 wherein the depth of scribed lines is adjustable.

10. In an automatic semi-conductor wafer scriber having a table reciprocable along one horizontal axis and laterally displaceable in constant increments along a second horizontal axis, a work table support pivotally secured to said table about a vertical axis, a pair of stops defining a horizontal line of registration for said support, resilient means urging said support against said stops, and plunger means for manually releasing said resilient means whereby said support may be rotated into another line of registration angularly indexed precisely with respect to the first.

11. The invention of claim 10 wherein one of said stops is angularly adjustable.

12. The invention of claim 10 wherein vacuum means communicates with the upper surface of said support, and a plane parallel surfaced plate in suction engagement with said support.

13. In an automatic semi-conductor wafer scriber having a table longitudinally reciprocable along one horizontal axis, means laterally moving said table in constant increments along a second horizontal axis, said means comprising an angularly reversible rotary drive, rotary ratchet means frictionally coupled with said rotary drive, a lead screw rotatably coupled with said ratchet means, drive pawl means directly coupled with said rotary drive engaging said ratchet means, and indexing pawl means actuated by the reciprocation of said table detachably engaging said ratchet means.

14. The invention of claim 13 wherein said rotary drive comprises a rack and pinion.

15. In an automatic semi-conductor wafer scriber having a table longitudinally reciprocable in a frame along one horizontal axis and laterally movable in constant increments along a second horizontal axis in a preferential direction, a scribing head pivotally suspended in said frame and restrained from descending below a predetermined horizontal plane, micrometer means supporting said scribing head and adapted to grossly position said head with respect to said wafer, and arcuately deformable fine positioning means supporting said micrometer means for delicately adjusting said scribing head vertically with respect to said wafer within a few one hundred thousandths of an inch.

16. The invention of claim 15 wherein said fine positioning means comprises a casing, a slide vertically reciprocable in said casing and supporting said scribing head, a bowed flat spring having one end engaging said slide and the other end engaging said casing, and a micrometer having the barrel thereof affixed to the casing and a spindle abutting said spring whereby longitudinal movement of the spindle in a preferential direction will straighten the spring and be translated into a proportionately reduced movement of said slide.

17. The invention of claim 15 wherein said scribing head comprises a yoke pivotally supported upon said frame and restrained from descending below a predetermined horizontal plane, a lever arm pivotally secured to said yoke, a stylus adjustably mounted upon one end of said arm, a lifter pivotally secured to said frame and resiliently urged into abutment with the other end of said arm, and crank means actuated by the reciprocation of said table camming said lifter so as to raise said stylus above the wafer during the return stroke of said table and thereafter to depress said lifter so as to lower said stylus immediately before the cutting stroke.

18. In an automatic semi-conductor wafer scriber having a table longitudinally reciprocable in a frame along one horizontal axis and laterally movable in constant increments along a second horizontal axis, a scribing head pivotally suspended from said frame, a slide vertically reciprocable in said frame and restraining said head from descending below a predetermined level, a flat spring in bowed configuration having one end engaging said slide and the other end mounted to said frame, and adjusting means abutting said spring to vary the degree of bow therein and translating a movement against said spring into a proportionally reduced movement of said slide.

19. In an automatic semi-conductor wafer scriber having a table longitudinally reciprocable in a frame along one horizontal axis and laterally movable in constant increments along a second horizontable axis, indexing means comprising a housing in said frame, oscillatory drive means in said housing coupled with the reciprocation of said table, ratchet means coupled with said drive means and converting the oscillations thereof into increments of angular rotation in a preferential direction, second ratchet means frictionally coupled with said first ratchet means, pawl means actuated by the reciprocation of said table cammed into engagement with said second ratchet means when said first ratchet means has been rotated a predetermined dimension, and second pawl means urged into engagement with said second ratchet means counter to the direction of said first pawl means immediately on disengagement of the latter, and a screw coupled to said second ratchet means so as to be intermittently rotated in precise angular increments.

20. In an automatic semi-conductor wafer scriber having a table longitudinally reciprocable in a frame along one horizontal axis and laterally movable in constant increments along a second horizontal axis in a preferential direction, indexing means comprising a housing having a shaft journaled therein, a gear rotatable on the shaft, oscillating input means coupled with said gear, a first ratchet wheel frictionally coupled to said shaft, a pawl oscillating with said input means and rotating said first ratchet wheel in angular increments in a preferential direction, a second ratchet wheel frictionally coupled to the shaft, a second pawl actuated by the reciprocation of said table cammed into engagement with said second ratchet wheel when said first ratchet wheel has been rotated a predetermined dimension, a third pawl urged into engagement with said second ratchet wheel immediately on disengagement of said second pawl and counter to the direction thereof, and a screw coupled to the shaft and intermittently angularly rotated in precise increments.

21. A semi-conductor wafer scriber comprising a frame, a table longitudinally reciprocable along one horizontal axis in said frame and laterally displaceable along a second horizontal axis transverse thereto, a scribing stylus urged into engagement with a wafer supported on said table during the stroke thereof in one direction and elevated out of engagement with the wafer during the stroke in the other direction, means imparting reciprocating motion to said table, drive means actuated by the reciprocation of said table imparting a uni-directional transverse motion thereto, and indexing means coupled with said first and second mentioned means progressively moving said table laterally a precise predetermined dimension with each full cycle of table reciprocation.

22. A semi-conductor wafer scriber comprising a frame, a table longitudinally reciprocable along a horizontal axis in said frame, a scribing stylus urged into engagement with a wafer supported on said table during the stroke thereof in one direction and elevated out of engagement with the wafer during the stroke in the other direction, means imparting a reciprocating motion to said table, intermittently-actuated drive means uni-directionally moving said table transverse to the axis of reciprocation, and indexing means laterally displacing said table progressively in precise increments along the transverse axis with each full cycle of table reciprocation.

References Cited in the file of this patent

UNITED STATES PATENTS

| | | |
|---|---|---|
| 1,558,513 | Souder | Oct. 27, 1925 |
| 2,367,839 | Grover | Jan. 23, 1945 |
| 2,438,813 | Lundeen | Mar. 30, 1948 |
| 2,527,338 | Stamm | Oct. 24, 1950 |
| 2,575,367 | Strong | Nov. 20, 1951 |
| 2,721,389 | Sayce | Oct. 25, 1955 |

OTHER REFERENCES

Physical Papers (H. A. Rowland), pages 691–697, Figs. 1–5, Johns Hopkins Press, 1902. (Copy in Scientific Library under call number QC 3 R 88.)